(12) United States Patent
Gmirya (10) Patent No.: US 9,618,378 B2
(45) Date of Patent: Apr. 11, 2017

(54) OIL LEVEL INDICATOR FOR ROTARY WING AIRCRAFT TRANSMISSION

(71) Applicant: Sikorsky Aircraft Corporation, Stratford, CT (US)

(72) Inventor: Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1009 days.

(21) Appl. No.: 13/745,886

(22) Filed: Jan. 21, 2013

(65) Prior Publication Data

US 2014/0203630 A1 Jul. 24, 2014

(51) Int. Cl.
*G01F 23/02* (2006.01)
*G01F 22/00* (2006.01)
*G01F 23/00* (2006.01)
*B64D 33/00* (2006.01)
*B64D 35/00* (2006.01)

(52) U.S. Cl.
CPC .............. *G01F 23/02* (2013.01); *G01F 22/00* (2013.01); *G01F 23/0007* (2013.01); *G01F 23/0046* (2013.01); *B64D 33/00* (2013.01); *B64D 35/00* (2013.01)

(58) Field of Classification Search
CPC .. G01F 22/00; G01F 23/0007; G01F 23/0046; G01F 23/00; G01F 23/02; B64D 33/00; B64D 2045/00; B64D 2045/0085
USPC ........................................................ 73/323
See application file for complete search history.

(56) References Cited

U.S. PATENT DOCUMENTS

| 1,979,705 | A | * | 11/1934 | Raymond | ............... G01F 23/02 73/290 R |
| 3,417,730 | A | * | 12/1968 | Colley | .................. G01F 23/292 116/227 |
| 3,835,709 | A | * | 9/1974 | Watson | ................... G01F 23/00 116/228 |
| 3,880,005 | A | * | 4/1975 | Butterfield | .............. G01F 23/02 116/227 |
| 4,440,022 | A | | 4/1984 | Masom | |
| 4,676,102 | A | | 6/1987 | Sarrat et al. | |
| 7,117,740 | B2 | | 10/2006 | Reinis | |

(Continued)

FOREIGN PATENT DOCUMENTS

DE 2628601 A1 * 12/1977 ............. G01F 23/00

*Primary Examiner* — Lisa Caputo
*Assistant Examiner* — Punam Roy
(74) *Attorney, Agent, or Firm* — Cantor Colburn LLP (57) ABSTRACT

A fluid level sensor for determining an amount of first fluid in a system is provided including a first substantially transparent sight glass mounted outside and fluidly coupled to a portion of the system. A level of first fluid in the first sight glass is indicative of the amount of first fluid in the system. A second substantially transparent sight glass has an independent closed loop containing a second fluid. The second sight glass is positioned adjacent outside the system. A plane of the second sight glass is arranged adjacent to a pivot point of the first fluid within the system. A level of second fluid in the second sight glass is indicative of the amount of first fluid corresponding to normal operation of the system. A comparison of the level of first fluid in the first sight glass and the level of second fluid in the second sight glass indicates if the amount of first fluid in the system requires adjustment.

16 Claims, 6 Drawing Sheets

(56) References Cited

U.S. PATENT DOCUMENTS

| | | | | |
|---|---|---|---|---|
| 7,334,464 B2* | 2/2008 | Goto | .................. | B64D 37/08 |
| | | | | 73/149 |
| 2009/0178479 A1* | 7/2009 | Pagovich | ................ | G01F 19/00 |
| | | | | 73/323 |

* cited by examiner

OIL LEVEL INDICATOR FOR ROTARY WING AIRCRAFT TRANSMISSION

BACKGROUND OF THE INVENTION

This invention was made with Government support under Agreement N00019-06-C-0081 awarded by the Department of the Navy. The Government has certain rights in the invention.

BACKGROUND OF THE INVENTION

Exemplary embodiments of the invention generally relate to lubrication systems, and more particularly, to an indicator for determining the amount of lubrication in a lubrication system of an aircraft.

A sealed gearbox having meshing gears, shaft bearing, and other components is provided with a continuous flow of lubricant in excess of that required for cooling. Lubricant within the gearbox is subject to churning where the lubricant hits the gears and to windage resulting from action of the gears throwing the lubricant. The churning and windage, as well as the viscous drag of the lubricant, results in heat generation. The amount of lubricant in the gearbox is critical for proper operation. For example, if the gearbox includes an excessive amount of lubricant, churning may occur which ultimately increases the temperature of the gearbox. If the gearbox has too little lubricant, the lubricant will degrade prematurely. Therefore, maintaining a proper amount of lubricant is important for a long-lasting and uninterrupted operation of transmissions.

Conventional systems include an indicator mechanism for determining the amount of lubricant within the system, such as a sight glass or dipstick for example. When the system is not positioned on a flat surface, however, the level of lubricant indicated by the indicator mechanism is affected, because the level is being measured outside of the system. For example, an indicator mechanism for a gearbox of an aircraft drive system having an acceptable level of lubricant may indicate that the system includes too much or too little lubricant depending on the incline of the aircraft.

BRIEF DESCRIPTION OF THE INVENTION

According to one embodiment of the invention, a fluid level sensor for determining an amount of first fluid in a system is provided including a first substantially transparent sight glass mounted outside and fluidly coupled to a portion of the system. A level of first fluid in the first sight glass is indicative of the amount of first fluid in the system. A second substantially transparent sight glass has an independent closed loop containing a second fluid. The second sight glass is positioned adjacent outside the system. A plane of the second sight glass is arranged adjacent a pivot point of the first fluid. A level of second fluid in the second sight glass is indicative of the amount of first fluid for normal operation. A comparison of the level of first fluid in the first sight glass and the level of second fluid in the second sight glass indicates if the amount of first fluid in the system requires adjustment.

According to another embodiment of the invention, a method of evaluating an amount of first fluid in a system is provided including viewing a level of the first fluid in a first sight glass fluidly coupled to system. A level of second fluid in a second sight glass is viewed. The level of the first fluid in the first sight glass and the level of the second fluid in the second sight glass are compared to determine whether the amount of first fluid in the system requires adjustment.

According to one embodiment of the invention, a transmission system is provided including a gearbox housing including an internal chamber containing a first fluid. The first fluid in the internal chamber has a generally central pivot point. A first substantially transparent sight glass is mounted to an exterior of the gearbox housing and is fluidly coupled to the internal chamber. The level of first fluid in the first fight glass is indicative of the amount of first fluid in the internal chamber. A second substantially transparent sight glass has an independent closed loop containing a second fluid. The second sight glass is positioned adjacent the exterior of the gearbox housing. A plane of the second sight glass is arranged adjacent a pivot point of the first fluid. A level of second fluid in the second sight glass is indicative of the amount of first fluid corresponding to normal operation of the system. A comparison of the level of first fluid in the first sight glass and the level of second fluid in the second sight glass indicated if the amount of first fluid in the internal chamber requires adjustment.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
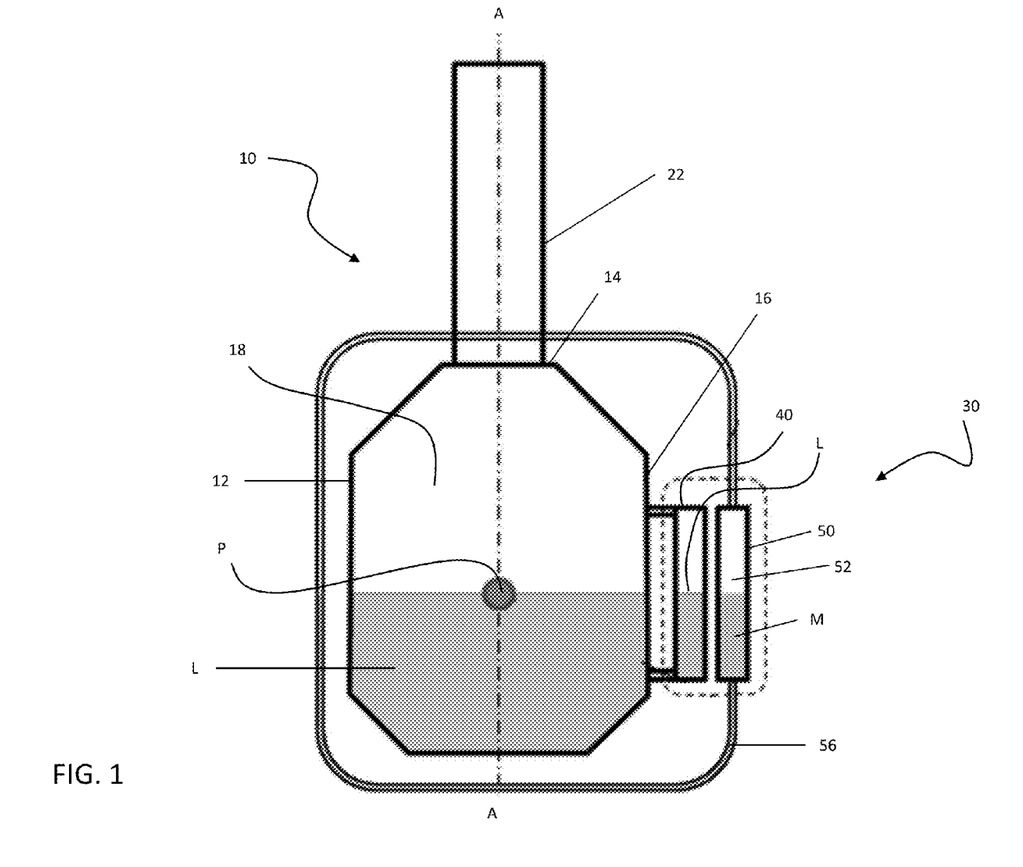
FIG. 1 is a cross-section of a portion of a gearbox housing having an optical fluid level sensor according to an embodiment of the invention.

Referring now to FIG. 1, a portion of a transmission or propulsion system 10 for a rotary wing aircraft is illustrated and includes a gearbox housing 12 having an internal chamber 18 partially filled with a first fluid L, such as a lubricant for example. The first fluid L within the chamber 18 includes a generally central pivot point P defined by the shape of the gearbox housing 12. When the gearbox housing 12 is rotated about the pivot point P (see FIGS. 2 and 3), for example when the rotary wing aircraft is at an incline about either its roll or pitch axis, the level of the first fluid L at the pivot point P remains generally constant. Extending from a portion of the internal chamber 18 through an upper surface 14 of the gearbox housing 12 is a rotor shaft 22. In embodiments where the housing 12 is symmetrical, as shown in FIG., the axis of rotation A of the rotor shaft 22 intersects the pivot point P of the first fluid L in the internal chamber 18. However, the invention is not limited thereto.

An optical fluid level sensor 30 is located adjacent an exterior surface 16 of the gearbox housing 12, and preferably in a position easily visually accessible by maintenance personnel. The fluid level sensor 30 includes a substantially transparent first sight glass 40. The first sight glass 40 is fluidly connected to the internal chamber 18 of the gearbox housing 12 such that the volume of first fluid L visible within the first sight glass 40 is indicative of the amount of first fluid L in the internal chamber 18. However, the volume of first fluid L visible within the first sight glass 40 will rise and fall relative to the pivot point P depending on the orientation of the aircraft. In one embodiment, the first sight glass 40 is mounted in to the gearbox housing 12 such that a plane of the first sight glass 40 includes the pivot point P of the first fluid L in the internal chamber 18.

The fluid level sensor 30 additionally includes a substantially transparent second sight glass 50 positioned near the first sight glass 40. The second sight glass 50 is coupled to an independent closed loop 56 containing a second fluid M. Consequently, the volume of the second fluid M within the closed loop system 56 should remain substantially constant. In one embodiment, the second fluid M is the same first fluid L as within the internal chamber 18 and the first sight glass 40, however the second fluid M and the first fluid L may be different. A plane extending through the second sight glass 50 is arranged such that the pivot point P of the internal chamber 18 is near to or substantially within the plane. In one embodiment, the plane is a mean plane, determined based on the average of the shape of the second sight glass 50. The precision of the second reference tube 50 may be increased by flattening the shape of the second reference tube 50 such that the mean plane extends through the center of the tube 50 and is as close to the pivot point P as possible. As illustrated in the FIG. 1, the plane of the first sight glass 40 and the plane of the second sight glass 50 may, but need not be, substantially identical.

The first sight glass 40 and the second sight glass 50 function as an actual indicator and a reference indicator of the level of first fluid L in the internal chamber 18 of the gearbox housing 12, respectively. As illustrated in FIG. 1, in one non-limiting embodiment, the first sight glass 40 and the second sight glass 50 are separate and distinct, and are mounted near one another adjacent the gearbox housing 12. In an alternative embodiment, illustrated in FIGS. 2-5, the first sight glass 40 and the second sight glass 50 are integrally formed. For example, the second sight glass 50 may extend outwardly from the plane of the first sight glass 40, such that the first fluid L in the first sight glass 40 and the lubricant M in the second sight glass 50 remain separated but are substantially coplanar. The integral formation of the first sight glass 40 and the second sight glass 50 allows a maintenance person to easily compare the levels of first fluid L, M indicated by each respective sight glass 40, 50. While not required in all aspects of the invention, the illustrated first sight glass 40 and second sight glass 50 do not include any conventional markings, such as labels indicating that the level of first fluid L in the gearbox housing 12 is normal, overfull, or requires additional lubricant for example. In one embodiment, the second sight glass 50 includes a plurality of calibrated markings 52 positioned at intervals to indicate to a maintenance person the amount of first fluid L that should be added to or removed from the internal chamber 18 of the gearbox housing 12 to achieve a normal volume.

Figure 2:
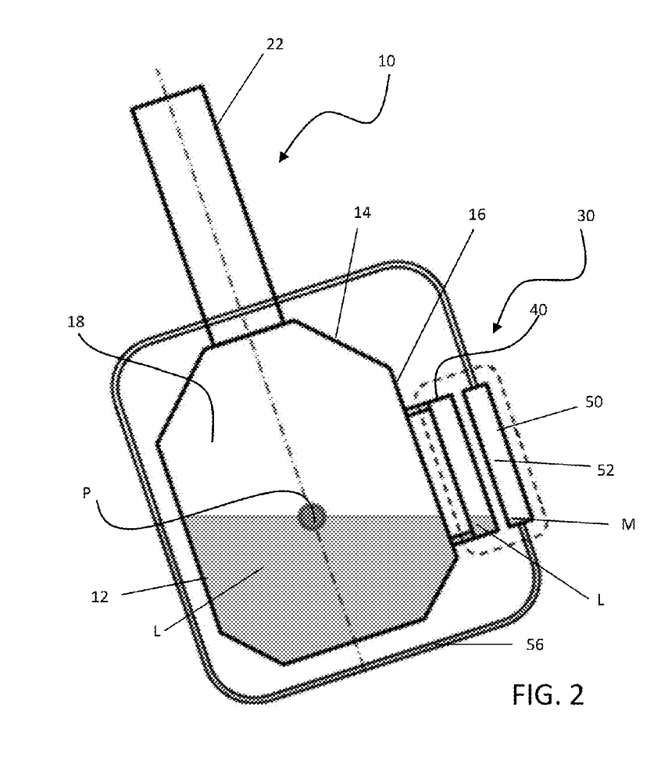
FIG. 2 is a cross-section of a portion of a gearbox housing having an optical fluid sensor, rotated in a first direction about a pivot point, according to an embodiment of the invention.
Figure 3:
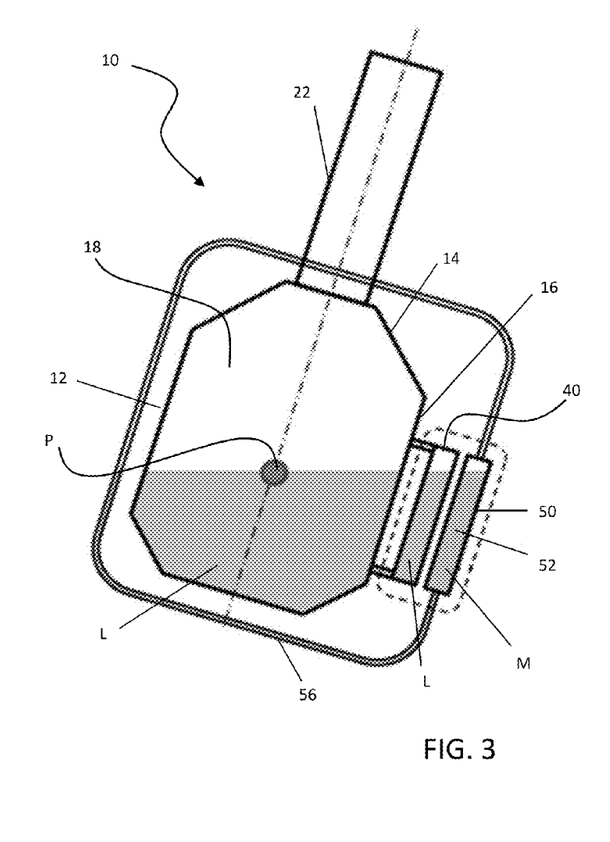
FIG. 3 is a cross-section of a portion of a gearbox housing having an optical fluid sensor, rotated in a second direction about a pivot point, according to an embodiment of the invention.
Figure 4:
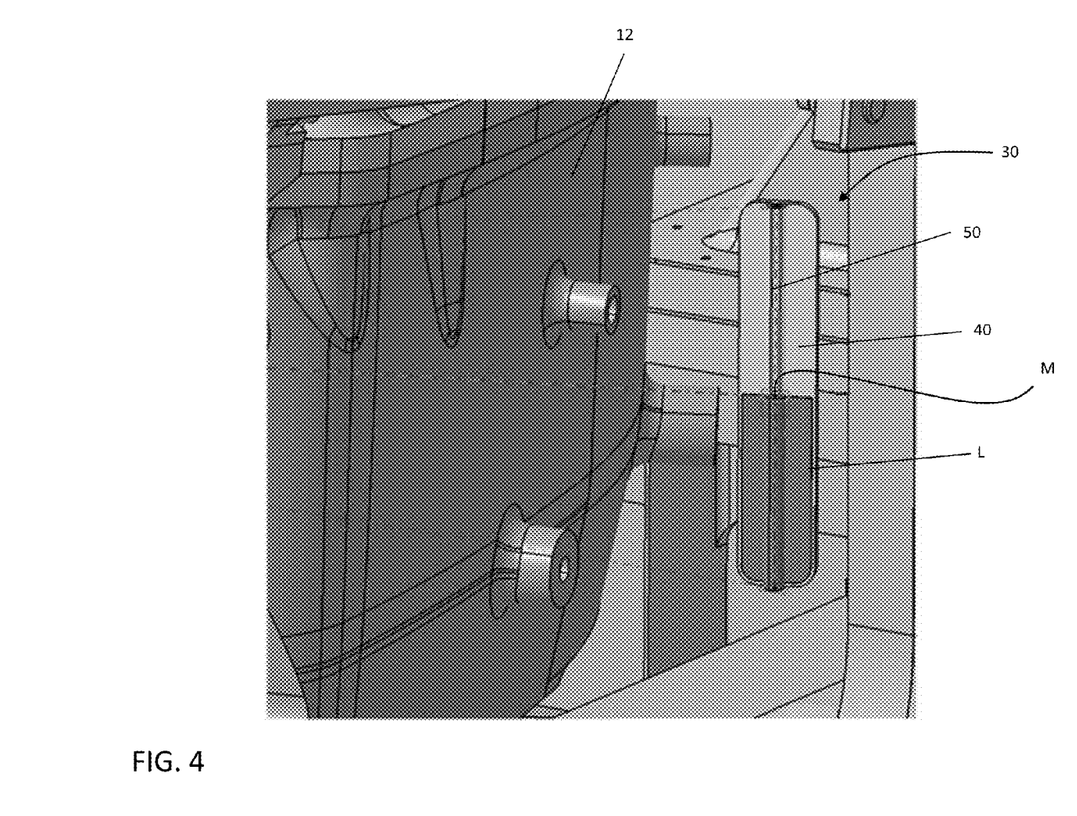
FIG. 4 is a perspective view of an optical fluid level sensor indicating a normal level of fluid according to an embodiment of the invention.
Figure 5:
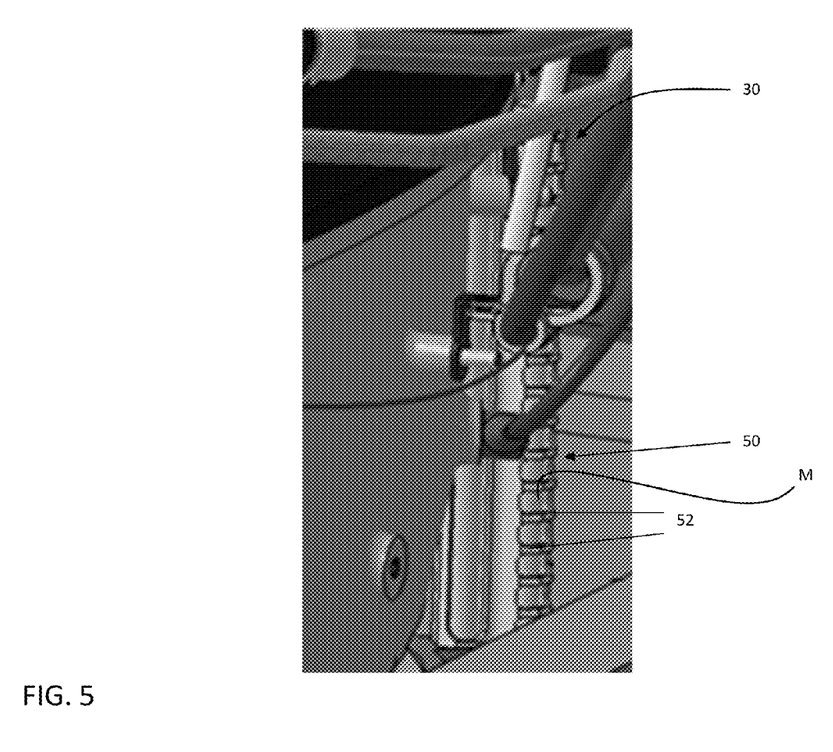
FIG. 5 is a perspective view of an optical fluid sensor according to an embodiment of the invention.

The second sight glass 50 functions as a true indicator of the amount of first fluid L that should be within the internal chamber 18 of the gearbox housing 12, regardless of any rotation of the gearbox housing 12 (see FIGS. 2 & 3). Therefore, by comparing the amount of first fluid L present in the actual or first sight glass 40 with the amount of lubricant M present in the reference or second sight glass 50, a maintenance person may determine whether the amount of first fluid L in the internal chamber 18 of the gearbox housing 12 needs to be altered. If the level or amount of first fluid L in the first sight glass 40 is substantially equal to and aligned with the amount of lubricant M in the second sight glass 50, as shown in FIGS. 2-4, the fluid level sensor 30 indicates that a "normal" amount of first fluid L is stored within the internal chamber 18 of the gearbox housing 12. Therefore, if the first and second sight glasses 40, 50 have substantially equal amounts of first fluid L, and second fluid M, the amount of first fluid L in the internal chamber 18 does not need to be adjusted.

Figure 6:
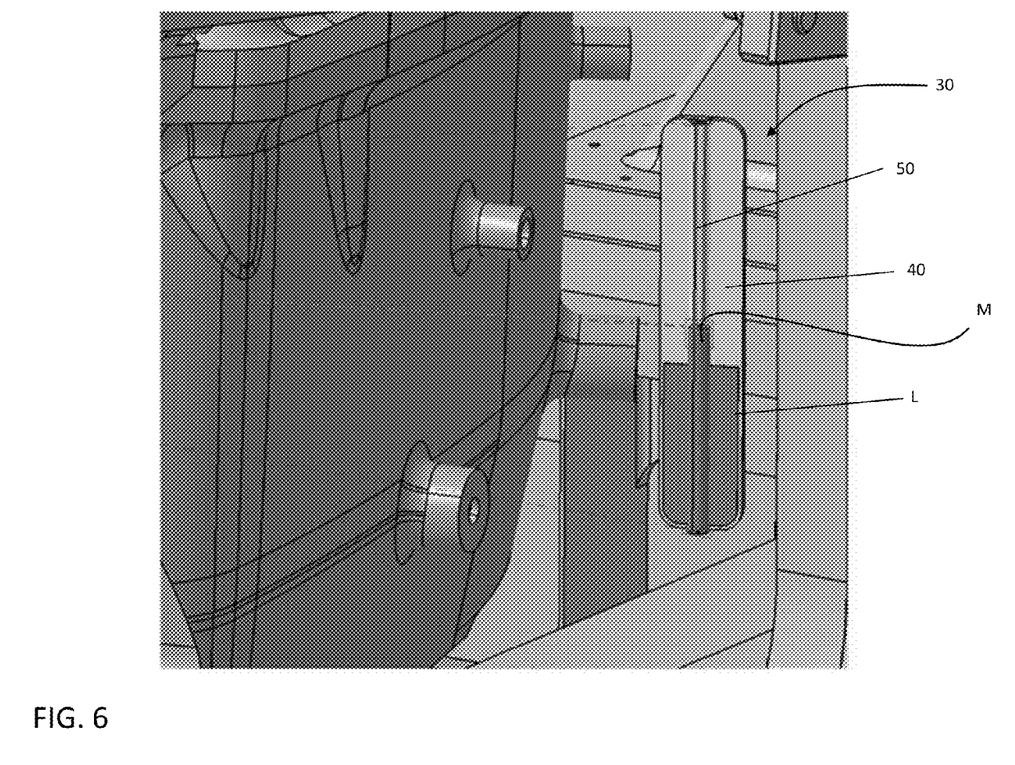
FIG. 6 is a perspective view of an optical fluid level sensor indicating that additional fluid is required according to an embodiment of the invention.
Figure 7:
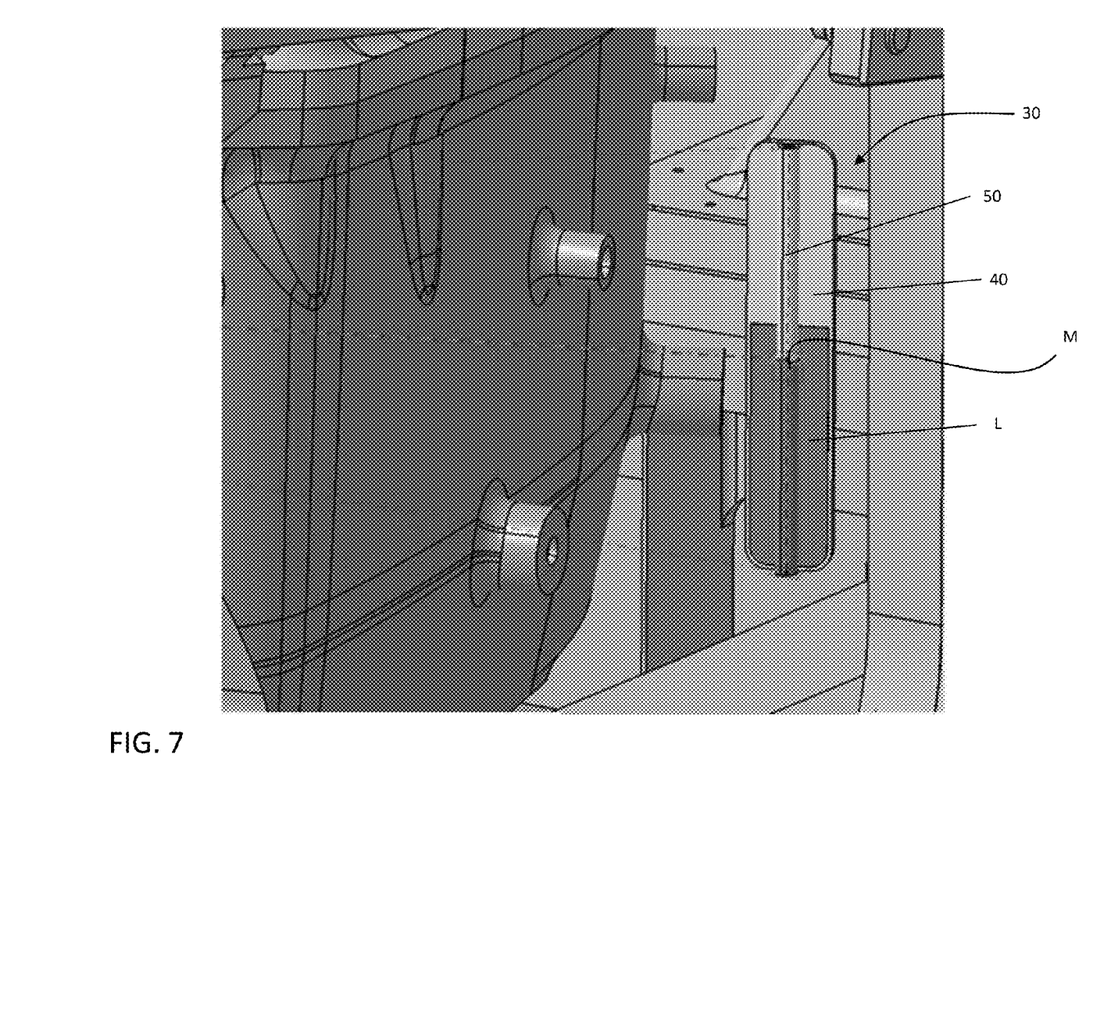
FIG. 7 is a perspective view of an optical fluid level sensor indicating an excess of fluid according to an embodiment of the invention The detailed description explains embodiments of the invention, together with advantages and features, by way of example with reference to the drawings.

When the level of first fluid L present in the first sight glass 40 is lower than the level of lubricant M in the second sight glass 50 (FIG. 6), the fluid level sensor 30 indicates that additional first fluid L should be added to the internal chamber 18 of the gearbox housing 12. A maintenance person may use the calibrated markings 52 on the second sight glass 50 in reference to the first sight glass 40 to determine exactly how much first fluid L should be added to the gearbox housing 12. Alternatively, when the level of first fluid L in the first sight glass 40 is higher than the level of lubricant M in the second sight glass 50 (FIG. 7), the fluid level sensor 30 indicates that the internal chamber 18 contains an excess amount of first fluid L. A person performing maintenance on the system 10 may then use the calibrated markings 52 on the second sight glass 50 with reference to the first sight glass 40 to determine the appropriate amount of first fluid L to remove from the internal chamber 18.

While described in terms of a gear box for a rotary wing aircraft, it is understood that aspects of the invention can be used in other contexts in which a level of fluid is to be observed. Examples include tanks (water, gas, etc. . . . ), whether in a vehicle or a stationary object. Further, while shown on an axis of rotation in FIG. 1, it is understood that aspects can be used in multi-rotational embodiments to indicate the amount of fluid therein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A fluid level sensor for determining an amount of a first fluid in a system, the fluid level sensor having a pivot point, the sensor comprising:

a first substantially transparent sight glass distinct from and mounted outside the system, the first substantially transparent sight glass being fluidly coupled to the first fluid in the system such that a level of first fluid in the first sight glass is indicative of the amount of the first fluid in the system; and a second substantially transparent sight glass having an independent closed loop containing a second fluid, the second sight glass being positioned outside the system such that a plane extending through the first sight glass and the second sight glass includes the pivot point, wherein a comparison of the level of first fluid in the first sight glass and a level of second fluid in the second sight glass indicates if the amount of first fluid in the system requires adjustment independent of an orientation of the system and if the level of first fluid and the level of second fluid are substantially identical, no adjustment of the amount of first fluid in the system is needed.

2. The fluid lever sensor according to claim 1, wherein if the level of first fluid in the first sight glass is generally above the level of second fluid in the second sight glass, the system includes an excess of first fluid.

3. The fluid lever sensor according to claim 1, wherein if the level of first fluid in the first sight glass is generally below the level of second fluid in the second sight glass are equal, more first fluid should be added to the system.

4. The fluid level sensor according to claim 1, wherein the first fluid and the second fluid are substantially identical.

5. The fluid level sensor according to claim 4, wherein the first fluid and the second fluid are a lubricant.

6. The fluid level sensor according to claim 1, wherein the second sight glass includes a plurality of calibrated markings.

7. The fluid level sensor according to claim 1, wherein the first sight glass and the second sight glass are positioned adjacent one another.

8. The fluid level sensor according to claim 7, wherein the first sight glass and the second sight glass are formed integrally.

9. The fluid level sensor according to claim 8, wherein the first sight glass and the second sight glass are substantially coplanar.

10. A method of evaluating an amount of first fluid in a system comprising:

viewing a level of the first fluid in a first sight glass, the first sight glass being distinct from and mounted to an exterior of the system, the first sight glass being fluidly coupled to the first fluid in the system such that a level of first fluid in the first sight glass is indicative of an amount of first fluid in the system;

viewing a level of a second fluid in a second sight glass, wherein a plane extending through the first sight glass and the second sight glass includes a pivot point of the system; and comparing the level of the first fluid in the first sight glass and the level of the second fluid in the second sight glass to determine whether the amount of first fluid in the system requires adjustment, wherein if the level of first fluid and the level of second fluid are substantially identical, no adjustment of the amount of first fluid is needed.

11. The method according to claim 10, further comprising adjusting the level of the first fluid in the system based on a difference between the level of the first fluid and the level of the second fluid.

12. The method according to claim 11, wherein if the level of the first fluid is higher than the level of the second fluid, the system is adjusted by removing excess first fluid.

13. The method according to claim 11, wherein if the level of the first fluid in the first sight glass is lower than the level of the second fluid in the second sight glass, the system is adjusted by adding first fluid.

14. The method according to claim 11, wherein the system is adjusted until the level of the first fluid in the first sight glass aligns with a corresponding calibrated marking on the second sight glass.

15. A transmission system comprising:

a gearbox housing including an internal chamber containing a first fluid, wherein the first fluid in the internal chamber has a generally central pivot point; and a fluid level sensor connected to the internal chamber, the fluid level sensor including:

a first substantially transparent sight glass mounted to an exterior of the gearbox housing and fluidly coupled to the internal chamber such that a level of first fluid in the first sight glass is indicative of the amount of the first fluid in the internal chamber; and a second substantially transparent sight glass having an independent closed loop containing a second fluid, the second sight glass being positioned adjacent the exterior of the gearbox housing such that the a plane extending through the first sight glass and the second sight glass is includes the pivot point of the first fluid in the system, wherein a level of second fluid in the second sight glass is indicative of the amount of first fluid desired for normal operation, such that a comparison of the level of first fluid in the first sight glass and the level of second fluid in the second sight glass indicates if the amount of first fluid in the internal chamber requires adjustment independent of an orientation of the transmission system.

16. The transmission system according to claim 15, wherein the transmission system is a portion of a drive system for a rotary wing aircraft.

* * * * *